(12) United States Patent
Van Duijnhoven et al.

(10) Patent No.: US 6,698,379 B2
(45) Date of Patent: Mar. 2, 2004

(54) INSTALLATION FOR TREATING FOOD PRODUCTS BY IMMERSION

(75) Inventors: Petrus Johannes Van Duijnhoven, Asten (NL); Nick William Boeijen, Sint-Oederode (NL)

(73) Assignee: CFS Bakel B.V., Bakel (NL)

( * ) Notice: Subject to any disclaimer, the term of this patent is extended or adjusted under 35 U.S.C. 154(b) by 0 days.

(21) Appl. No.: 10/176,531

(22) Filed: Jun. 24, 2002

(65) Prior Publication Data

US 2003/0000394 A1 Jan. 2, 2003

(30) Foreign Application Priority Data

Jun. 27, 2001 (NL) .............................................. 1018404

(51) Int. Cl.$^7$ ................................................. B05C 3/02
(52) U.S. Cl. ............................. 118/26; 118/30; 118/70; 118/423; 99/404; 99/443 C
(58) Field of Search ................................ 118/26, 30, 70, 118/423; 426/302; 99/355, 422, 404, 443 C

(56) References Cited

U.S. PATENT DOCUMENTS 5,954,876 A * 9/1999 Koch et al. ................... 118/13

FOREIGN PATENT DOCUMENTS

EP        1 106 067 A1    6/2001

OTHER PUBLICATIONS

Internet Article, 'Online!—XP002192305, Gevonden op het Internet: <URL:http://www.nothum.com/product–line/batter–coating/batter–pro–features01.html>'gevonden op Mar. 7, 2002! het gehele document.

* cited by examiner

Primary Examiner—Laura Edwards
(74) Attorney, Agent, or Firm—Sughrue Mion, PLLC

(57) ABSTRACT

An installation for coating food products with a layer of coating substance, such as for coating a meat product or a vegetable product with a batter, comprises a container in which the coating substance can be accommodated, two endless conveyor belts located one above the other, those parts of which that face one another extending through the container enclosing a gap for feeding the food products through the coating substance, as well as adjustment means for moving the conveyor belts apart or towards one another in connection with adjustment of the width of the gap. The adjustment means have a central control for adjusting the width of the gap.

13 Claims, 4 Drawing Sheets

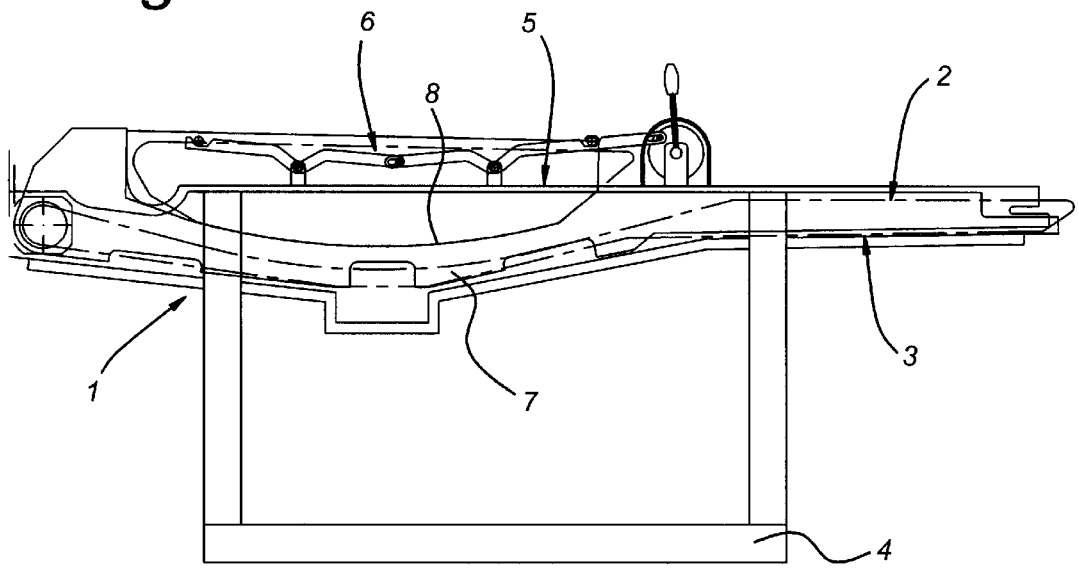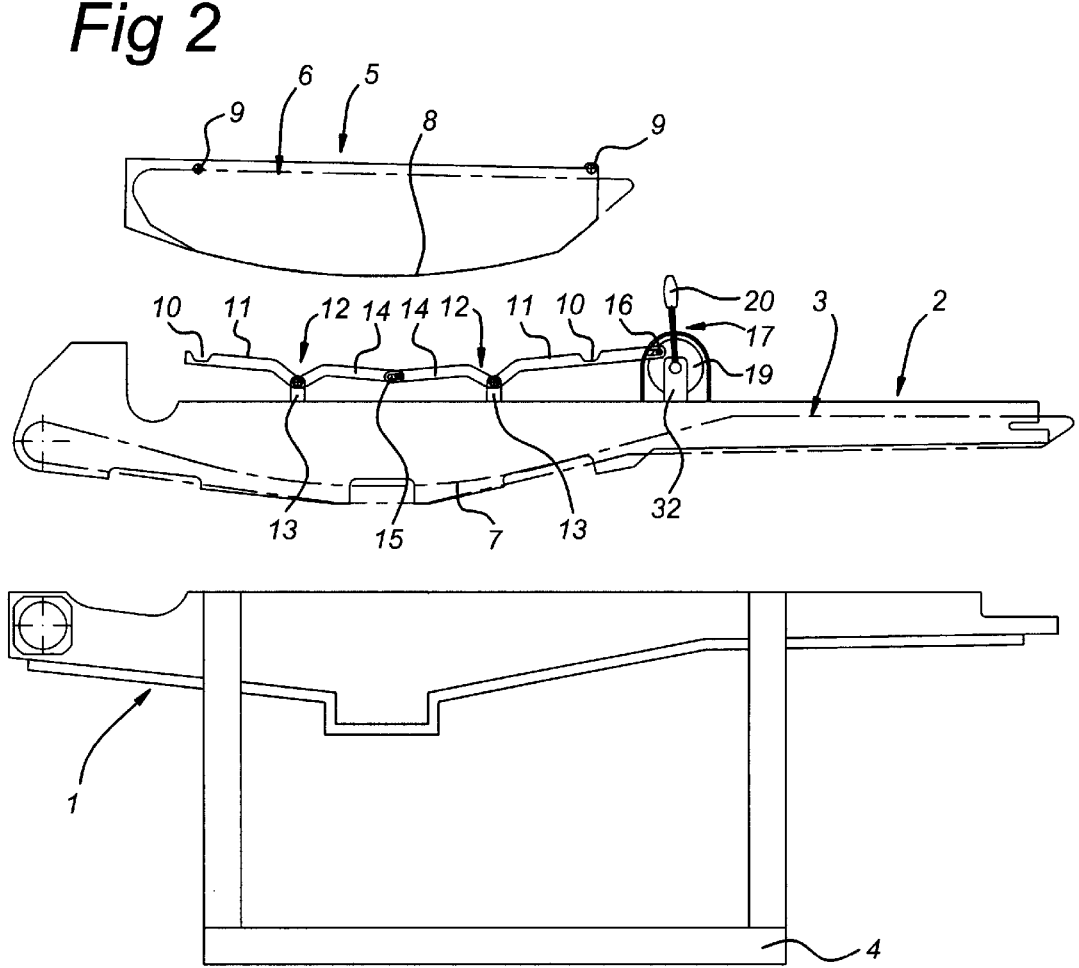

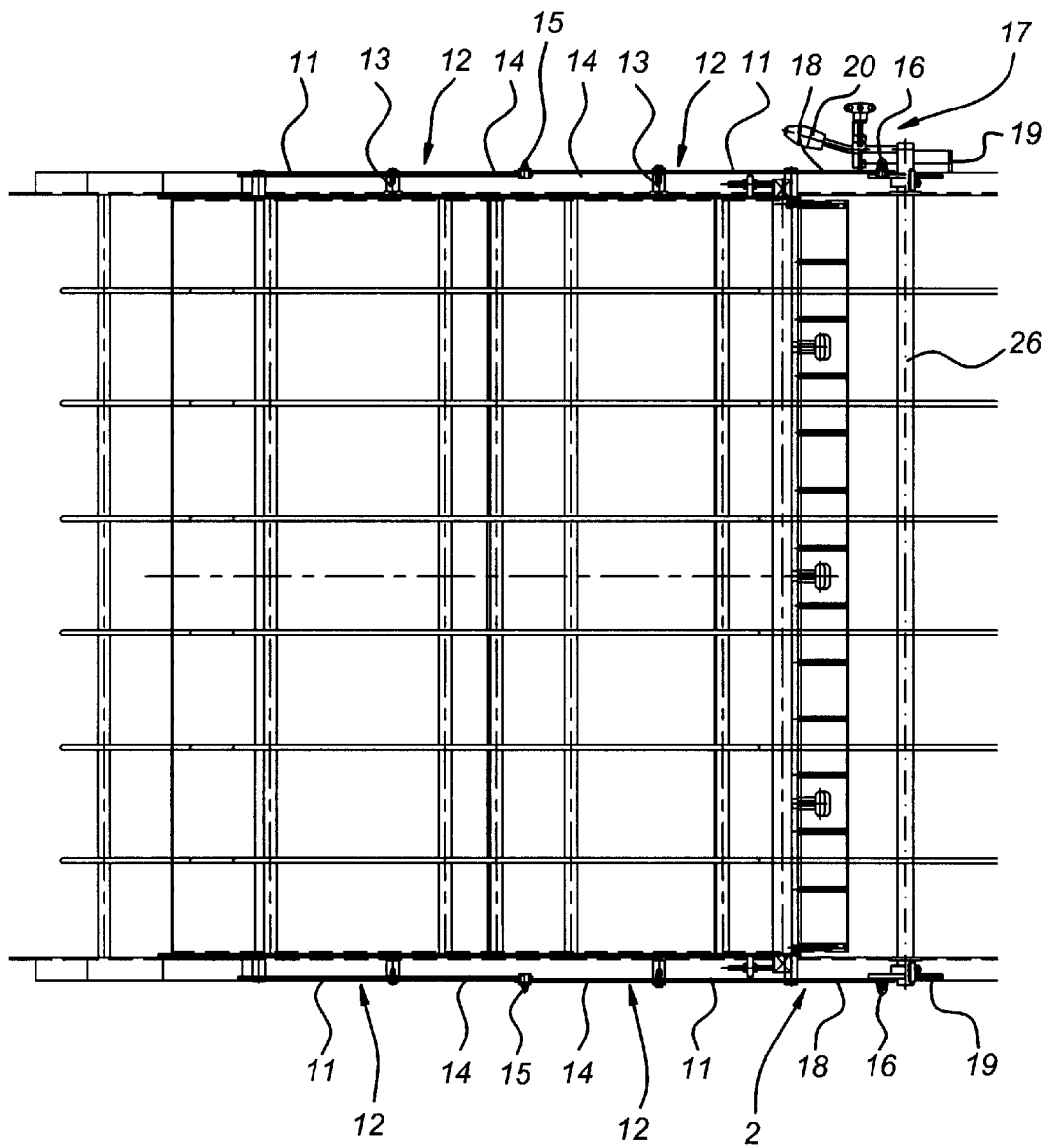

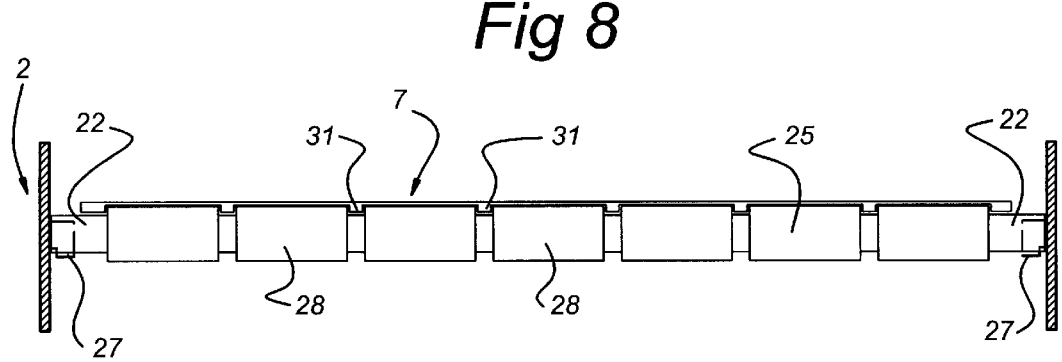
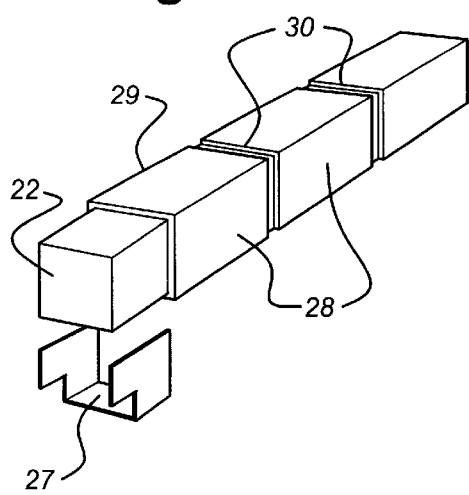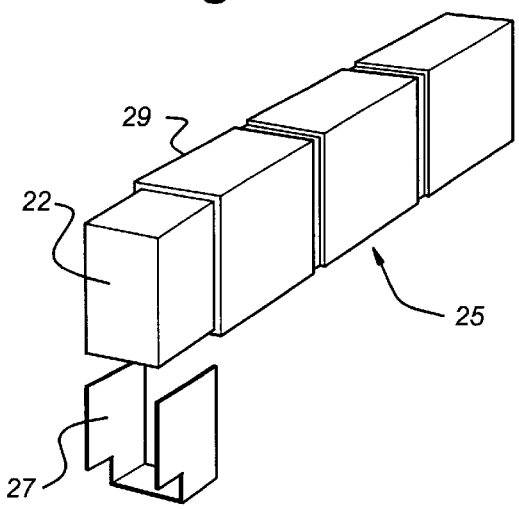
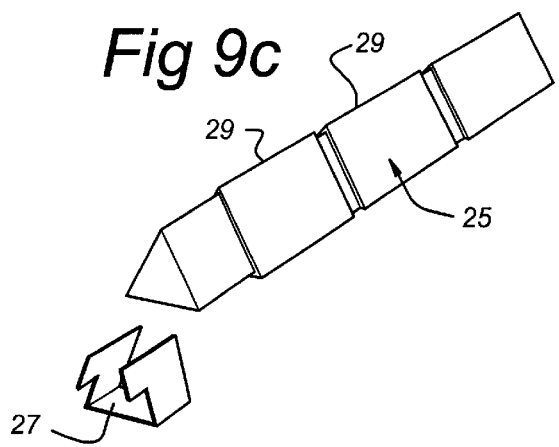

INSTALLATION FOR TREATING FOOD PRODUCTS BY IMMERSION

INSTALLATION FOR TREATING FOOD PRODUCTS BY IMMERSION

The invention relates to an installation for treating food products with a substance, such as for coating a meat product or a vegetable product with a batter, comprising a container in which the coating substance can be accommodated, two endless conveyor belts located one above the other, those parts of which that face one another extending through the container enclosing a gap for feeding the food products through the coating substance, the upper conveyor belt being accommodated on an upper frame that is mounted by means of adjustable supports such that it can be moved up and down with respect to the container in connection with adjustment of the width of the gap.

An installation of this type is disclosed in EP-A 1 106 067. This known installation is intended for treating food products in a heated fluid, such as cooking oil. In another known installation the container contains a coating substance such a batter or tempura. Such a substance is prepared in advance and has, inter alia, a large number of gas inclusions which contribute to the specific characteristics thereof. It is not advisable to pump a substance of this type, since this structure of the substance would be destroyed by pumping.

For these reasons the food products are immersed in the substance. The conveyor belts force the food products below the nominal level of the coating substance in the container. By this means it is ensured that the food products are completely coated on all sides.

The width of the gap between the conveyor belts can be adjusted depending on the thickness of the products. Consequently, for each product the correct driving action can be transmitted by the conveyor belts, such that the products can be fed through and immersed at a specific speed. The positions of the products with respect to one another also remain the same, such that the products are transported in accordance with a fixed, constant pattern.

In the known installation the width of the gap is adjusted by a central control. The upper conveyor belt is accommodated on a frame that is mounted, such that it can be moved up and down, on the frame of the lower conveyor belt by means of adjustable supports, which adjustable supports are coupled to the central control.

The frame with the upper conveyor belt can be moved easily up and down by manipulating the central control. Changing the settings of the installation for processing other products can thus be carried out rapidly.

The adjustable supports of the installation disclosed in EP-A 1 106 067 comprise wedge-shaped elements that can be slid over one another. The aim of the invention is to provide an installation with adjustable supports which are simpler and make it possible easily to remove the upper conveyor belt for cleaning the container. According to the invention, to this end the adjustable supports each comprise a lever and a fixed support. Each lever is mounted such that it can pivot and movably interacts with the associated support.

In case the lower conveyor belt is accommodated on a lower frame, at least one of the levers can be mounted on the upper frame or on the lower frame, and the corresponding support can be mounted to the other of said frames.

In particular, at least two levers can be provided, each of which forms part of a seesaw, which see-saws have see-saw arms which are oriented towards one another and are joined to one another at their ends by means of a rotaryjoint that allows mutual sliding movement. One of the see-saws of each pair of see-saws is connected to a rotary element that is provided with a central operating lever. The lever of the see-saw connected to the rotary element has an extension that is connected to the rotary element by means of a rotary joint that allows sliding movement.

In connection with stable support of the frame, two pairs of see-saws are preferably provided, each pair of which is on one side of one of the frames.

Furthermore, a scraper element can be present underneath the upper part of the lower conveyor belt for scraping off coating substance adhering to that part, which scraper element is located above the nominal level of the coating substance in the container.

If the conveyor belt is constructed as a wire belt consisting of pieces of wire that are oriented transversely and hingeably joined to one another, the scraper element must have a profile that corresponds to the cross-sectional shape of the wire belt.

The scraper element has a locating projection at both ends, each locating projection being held in an associated support on the lower frame such that it can be removed.

The scraper element can, for example, have a square cross-section. Consequently it can be mounted in various positions with different degrees of rotation. As soon as the scraping edge of one of the sides of the scraper element has worn as a result of prolonged sliding contact with the conveyor belt, the scraper element can be turned such that a fresh scraping edge that is not yet worn becomes available.

The invention will be explained in more detail below with reference to an installation according to the invention shown in the figures.

FIG. 1 shows a side view of the installation according to the invention.

FIG. 2 shows the installation taken apart.

FIG. 7 shows a partial plan view of the installation in FIG. 1.

FIG. 8 shows a front view of a scraper element.

FIGS. 9a–9c show various variants of the scraper element with mounting bracket.

Figure 3:
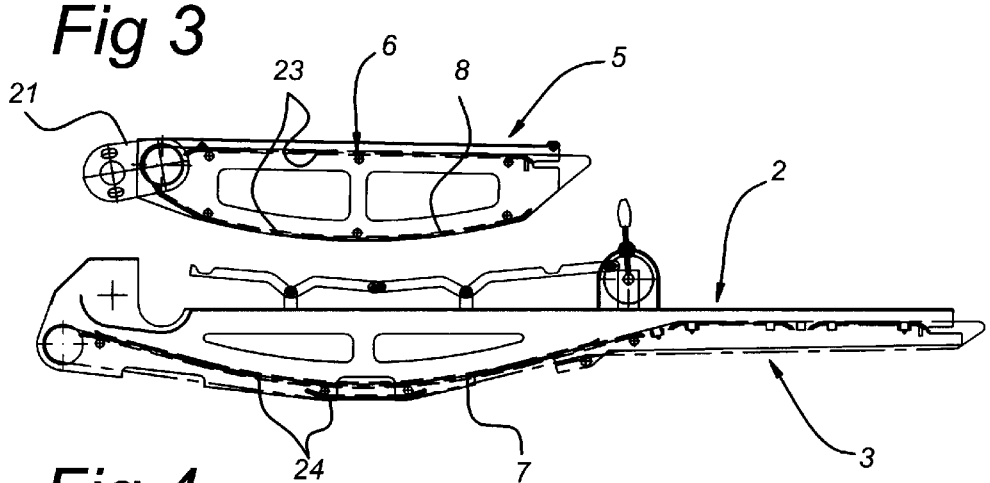
FIG. 3 shows the part of the installation with the conveyor belts and associated frames, taken apart.

The installation according to the invention shown in FIGS. 1 and 2 comprises a container 1, in which a frame 2 is accommodated that supports the lower conveyor belt 3. This frame is also shown in FIG. 7 and has four levers 11. These levers 11 each have a recess 101, in each of which recesses one support 9 of an upper frame 5 is supported. These levers 11 form part of the see-saws indicated in their entirety by 12. These see-saws 12 are pivotably mounted on the lower frame 2 by means of supports 13. They each also have seesaw arms 14, which are connected to one another by means of a joint 15 that allows sliding movement.

An operating element indicated in its entirety by 17 is connected to one of the levers 11 by means of an extension 18 via a movable joint 16. This operating element 17 is mounted on the lower frame 2 by means of a support 32 such that it can rotate and has a disc 19 and a handle 20.

Figure 4:
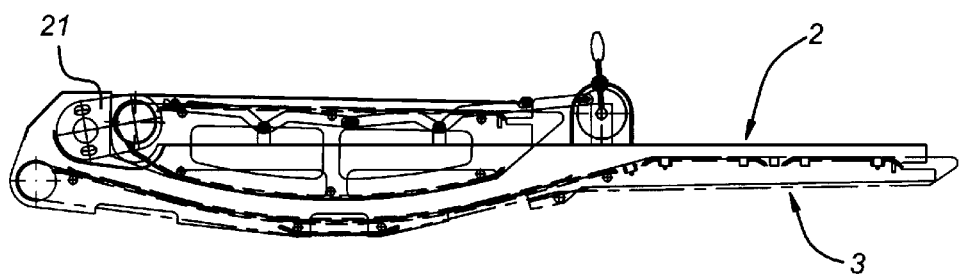
FIGS. 4–6 show the conveyor belts in various positions with respect to one another.
Figure 5:
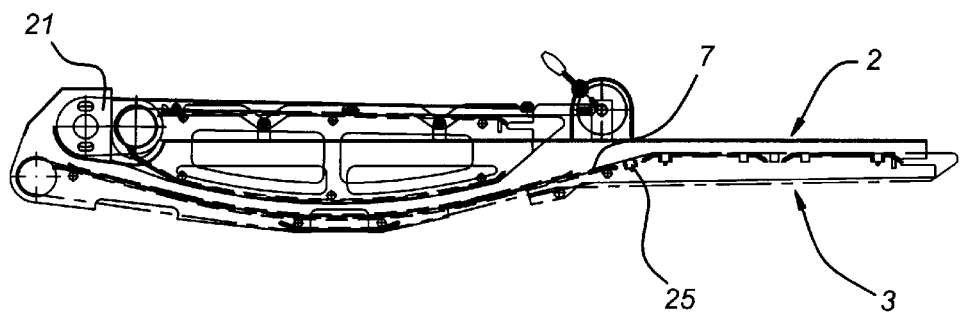
Figure 6:
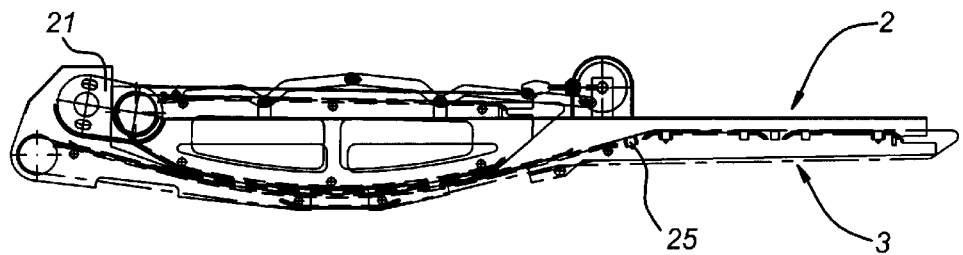

By moving the handle 20 from the upright position, as shown in FIG. 4, into a horizontal position as shown in the steps in FIGS. 5 and 6, the levers 11, and thus the seats 10 for the supports 9, are moved downwards. By this means the distance between the parts 7, 8 of the conveyor belts 3, 6 that are facing one another can be varied, depending on the thickness of the products that have to be fed through the coating substance present in the container 1.

In the longitudinal direction of the conveyor belts 3, 6, the upper frame 5 is fixed with respect to the lower frame 2 by means of the link 21, which makes a turning movement during the adjustment movement: see FIG. 3 et seq.

It is pointed out that the conveyor belt 6 is guided in the upper frame by means of guides 23 known per se; the lower conveyor belt 3 is also guided in the lower frame 2 by means of guides 24 known per se; see FIG. 3. By this means the curved shape of the parts 8, 7 facing one another can be maintained.

As shown in FIG. 7, there are two see-saws 12 on either side of the frame 2, each of which is connected to a disk 19 via a joint 15 that allows sliding movement. The two disks 19 are connected to one another by means of a torsionally rigid rod 26, in such a way that by manipulating the handle 20 that is joined to the one disk 19 the other two see-saws 12 are also operated via the torsion rod 26 and the other disk 19 in order to move the upper frame 5 uniformly up and down.

As can be seen in the side views in FIGS. 3–6, a scraper element 25 is fitted beneath the upper part 7 of the lower conveyor belt 3. This scraper element is shown in FIG. 8; various variants are shown in FIGS. 9a, 9b and 9c. These scraper elements each have a locating projection 22, that is mounted by means of a supporting bracket 27 on the lower frame 2.

The scraping element has flat surfaces 28, which are separated by a sharp corner edge 29. Furthermore, notches 30 are provided regular distances apart, in which notches the relief 31 on the wire conveyor belt 3 is accommodated. When the conveyor belt 3 moves over these scraper elements 25 the adhering substance is scraped off the latter in a reliable manner.

If the sharp edges 29 have become worn after some time, it suffices to turn the scraper element 25 through a quarter turn (insofar as it is the variant in FIGS. 9a and 9b that is concerned), such that a sharp edge 29 is again available.

The variant in FIG. 9c has a triangular shape and has three sharp edges 29.

What is claimed is:

1. Installation for coating food products with a layer of coating substance, such as for coating a meat product or a vegetable product with a batter, comprising a container (1) in which the coating substance can be accommodated, two endless conveyor belts (3, 6) located one above the other, those parts (7, 8) of which that face one another extending through the container enclosing a gap for feeding the food products through the coating substance, as well as adjustment means (10–20, 26) for moving the conveyor belts (3, 6) apart or towards one another in connection with adjustment of the width of the gap, which upper conveyor belt (3) is accommodated on an upper frame (5) that is mounted on the container by means of adjustable supports (10–18) such that it can be moved up and down, characterised in that the adjustable supports (10–18) each comprise a lever (11) that is mounted on the lower frame (2) or the upper frame (5), as well as a fixed support (9) mounted on the other of said frames (2, 5), said lever (11) being pivotally mounted (13) and movably (10) interacting with the associated support (9).

2. Installation according to claim 1, wherein the adjustable supports (10–18) are connected to a central control (19, 20, 26).

3. Installation according to claim 1, wherein at least two levers (11) are provided, each of which forms part of a see-saw (12), which see-saws (12) have see-saw arms (14) which are oriented towards one another and are joined to one another at their ends by means of a rotary joint (15) that allows mutual sliding movement.

4. Installation according to claim 3, wherein one of the see-saws (12) of each pair of see-saws (12) is connected to a rotary element (17) that is provided with an operating element such as a central operating lever (20), a pneumatic cylinder and the like.

5. Installation according to claim 4, wherein the lever (11) of the see-saw (12) connected to the rotary element (17) has an extension (18) that is connected to the rotary element (17) by means of a rotary joint (16) that allows sliding movement.

6. Installation according to claim 5, wherein two pairs of see-saws (12) are provided, each pair of which is on one side of the container (1).

7. Installation according to claim 1, wherein those parts (7, 8) of the conveyor belts (3, 6) that are facing one another are curved in accordance with a relatively large radius of curvature.

8. Installation according to claim 1, wherein those parts (7, 8) of the conveyor belts (3, 6) that are facing one another are at least partially below the nominal level of the coating substance in the container (1).

9. Installation according to claim 1, wherein the lower conveyor belt (3) is accommodated on a lower frame (2), at least one of the levers (11) is mounted on the upper frame (5) or on the lower frame (2), and the corresponding support (9) is mounted to the other of said frames (5, 2).

10. Installation according to claim 1, wherein a scraper element (25) is present underneath the upper part (7) of the lower conveyor belt (3) for scraping off coating substance adhering to that part (7), which scraper element (25) is located above the nominal level of the coating substance in the container (1).

11. Installation according to claim 10, wherein the lower conveyor belt (3) is constructed as a wire belt consisting of pieces of wire that are oriented transversely and hingeably joined to one another, and the scraper element (25) has a profile that corresponds to the cross-sectional shape of the wire belt (3).

12. Installation according to claim 10, wherein the scraper element (25) has a locating projection (22) at both ends, and each locating projection (22) being held in an associated supporting bracket (27) on the lower frame (2) such that it can be removed.

13. Installation according to claim 12, wherein the scraper element (25) has a regular polygonal, for example a square, cross-section and has a scraping edge (29) determined by two adjacent surfaces (28) in each case.

* * * * *